United States Patent
Forman et al.

(10) Patent No.: US 6,772,374 B2
(45) Date of Patent: Aug. 3, 2004

(54) CONTINUOUS LANGUAGE-BASED PREDICTION AND TROUBLESHOOTING TOOL

(75) Inventors: George H. Forman, Port Orchard, WA (US); Henri Jacques Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 582 days.

(21) Appl. No.: 09/846,007

(22) Filed: Apr. 30, 2001

(65) Prior Publication Data

US 2002/0162056 A1 Oct. 31, 2002

(51) Int. Cl.[7] .............................................. H03M 13/03
(52) U.S. Cl. ............................ 714/46; 714/57; 705/26; 707/6
(58) Field of Search ............................ 714/46, 4, 57; 707/6; 705/26

(56) References Cited

U.S. PATENT DOCUMENTS

| | | | | |
|---|---|---|---|---|
| 5,826,008 A | * | 10/1998 | Bluvband | .................... 714/57 |
| 6,212,494 B1 | * | 4/2001 | Boguraev | ...................... 704/9 |
| 6,230,287 B1 | * | 5/2001 | Pinard et al. | ................. 714/31 |
| 6,389,561 B1 | * | 5/2002 | Bluvband | ..................... 714/57 |
| 6,442,542 B1 | * | 8/2002 | Ramani et al. | ................ 707/3 |
| 6,487,677 B1 | * | 11/2002 | Jantz et al. | .................... 714/2 |
| 6,513,129 B1 | * | 1/2003 | Tentij et al. | ................... 714/4 |
| 6,532,426 B1 | * | 3/2003 | Hooks et al. | ................. 702/81 |
| 6,633,782 B1 | * | 10/2003 | Schleiss et al. | ............... 700/26 |

* cited by examiner

*Primary Examiner*—Scott Baderman
*Assistant Examiner*—Anne L. Damiano

(57) ABSTRACT

A real time, computerized, method, system, and method of doing business with respect to troubleshooting and resolving installed base product failures. A client establishes a link with the business server, filing a report describing the product and failure mode in plain text. The server compares the failure mode plain text to a historical data base, associating maintained keywords likely to appear in the report to product subunits associated with failure modes. Based on the comparison, the server calculates and transmits to the client predictions of resolving the failure. The client is provided with on-line capability for selecting and ordering replacements. The process is continuous, iterative, and interactive.

20 Claims, 3 Drawing Sheets

CONTINUOUS LANGUAGE-BASED PREDICTION AND TROUBLESHOOTING TOOL

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND OF THE INVENTION (1) Field of the Invention

The present invention relates generally to technical support of commercial and installed-base products, and more specifically to an automated predicting and troubleshooting tool for installed-base apparatus.

(2) Description of Related Art

Currently, it is highly expensive for equipment manufacturers, particularly computer apparatus original equipment manufacturers ("OEM") and their related companies, to support installed-base equipment. Typically, a customer, for example, an end-user of a Hewlett-Packard® ink-jet printer, telephones a call agent to report a problem. This call agent guides the customer through a troubleshooting sequence—generally in a question-and-answer format—that hopefully leads to resolution of the problem or at least an identification of the likely cause. The question-and-answer sequence is a knowledge-based system based on prior experiences which have been formatted into case base, decision tree, troubleshooting flow charts, and the like as are commonly known, for use by the manufacturer's call agent. Furthermore, the session is likely to be based on the individual expertise of the call agent handling the immediate matter.

Attempts are on-going to try to automate such systems. One such attempt involves the use of Bayesian networks (a directed acyclic graphical representation of causal relationships between variables, associating conditional probability distributions to variables given their parents). Pending patent applications assigned to the common assignee herein, Hewlett-Packard Company, teach A METHOD FOR KNOWLEDGE ACQUISITION FOR DIAGNOSTIC BAYESIAN NETWORKS (Skaaning et al., Ser. No. 09/261,769, filed Mar. 3, 1999) and AUTOMATED DIAGNOSIS OF PRINTER SYSTEMS USING BAYESIAN NETWORKS (Ser. No. 09/353727, filed Jul. 14, 1999, by Skaaning et al.).

Existing software troubleshooter agents take input from a question-and-answer dialogue as the series of provided answers, typically in multiple choice format. The order of the questions is controlled by the software, treating the end-user like a "subroutine" to obtain diagnostic information. This can be frustrating and inefficient, particularly in situations where the end-user has a good idea of what the actual fault may be. Few, if any, existing automated troubleshooter agents or programs take unstructured text for diagnostic input purposes.

Thus, there is a need for an automated system and methodology working in real-time to troubleshoot problems and predict probable solutions.

BRIEF SUMMARY OF THE INVENTION

The present invention provides a free-form text or voice input system for troubleshooting and problem resolution that restores control to the end-user. The need is fulfilled in an automated free-form data input and analysis format without ruling out suggestive question-and-answer aid. The present invention can provide for a mixed initiative troubleshooting session, where both human and computerized interface can indicate next logical steps of the troubleshooting and potential resolution prediction process.

More specifically, the present invention provides a prediction/troubleshooting tool, working progressively in a real-time based systematic manner on "clues" or "hints" appearing in a stream of plain text (or speech if voice-recognition is employed).

In its basic aspect, the present invention provides a computerized diagnostic system including: a data base correlating product information with keywords related to failure modes; and an interface program for receiving plain text related to the failure modes and for comparing said plain text to the keywords and for predicting probabilities of potential solutions to said failure modes based upon said comparing.

In another aspect, the present invention provides a method for troubleshooting product failures, the method including: providing a data base correlating product information with keywords related to failure modes; using a network link, reporting at least one specific one of said failure modes of at least one product; in real time, comparing correlated product information from said data base to said reporting at least one specific one of said failure modes, and based on said comparing, predicting probabilities of effectiveness of potential solutions to curing said at least one specific one of said failure modes.

In still another aspect, the present invention provides a computer memory including: program code associated with a network server and client system, said program code including subroutines associated with said client providing a plain text report of a failed client subsystem, subroutines associated with said server for comparing said plain text report to a predetermined data base having individual units of the subsystem correlated with keywords associated with failure mode descriptions, and subroutines for using said comparing and generating a report to the client of probabilities of selected solutions to the failed client subsystem.

In yet another aspect, the present invention provides a method of doing business with respect to troubleshooting and providing solutions to reported failures of installed base products, wherein an entity doing said business maintains a data base of product information correlated to failure mode scenario information as represented by keywords, the method including: establishing a server having an internet access site;

providing a resolution prediction troubleshooting tool at said site; allowing client access to said site via a browser; following client access of the site, receiving a client generated report of at least one specific one of said failures of at least one installed base product; and in real time, comparing the keywords to said report, based on said comparing, predicting probabilities of potential solutions to curing a specific failure represented by said report, and transmitting said probabilities to said client.

Note that the invention allows combining with business information and data, such as costs and inventory, to recommend specific action(s).

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Objects, features and advantages of the present invention will become apparent upon consideration of the following explanation and the accompanying drawings, in which like reference designations represent like features throughout the drawings.

The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated by the inventors for practicing the invention. Alternative embodiments are also briefly described as applicable.

Figure 1:
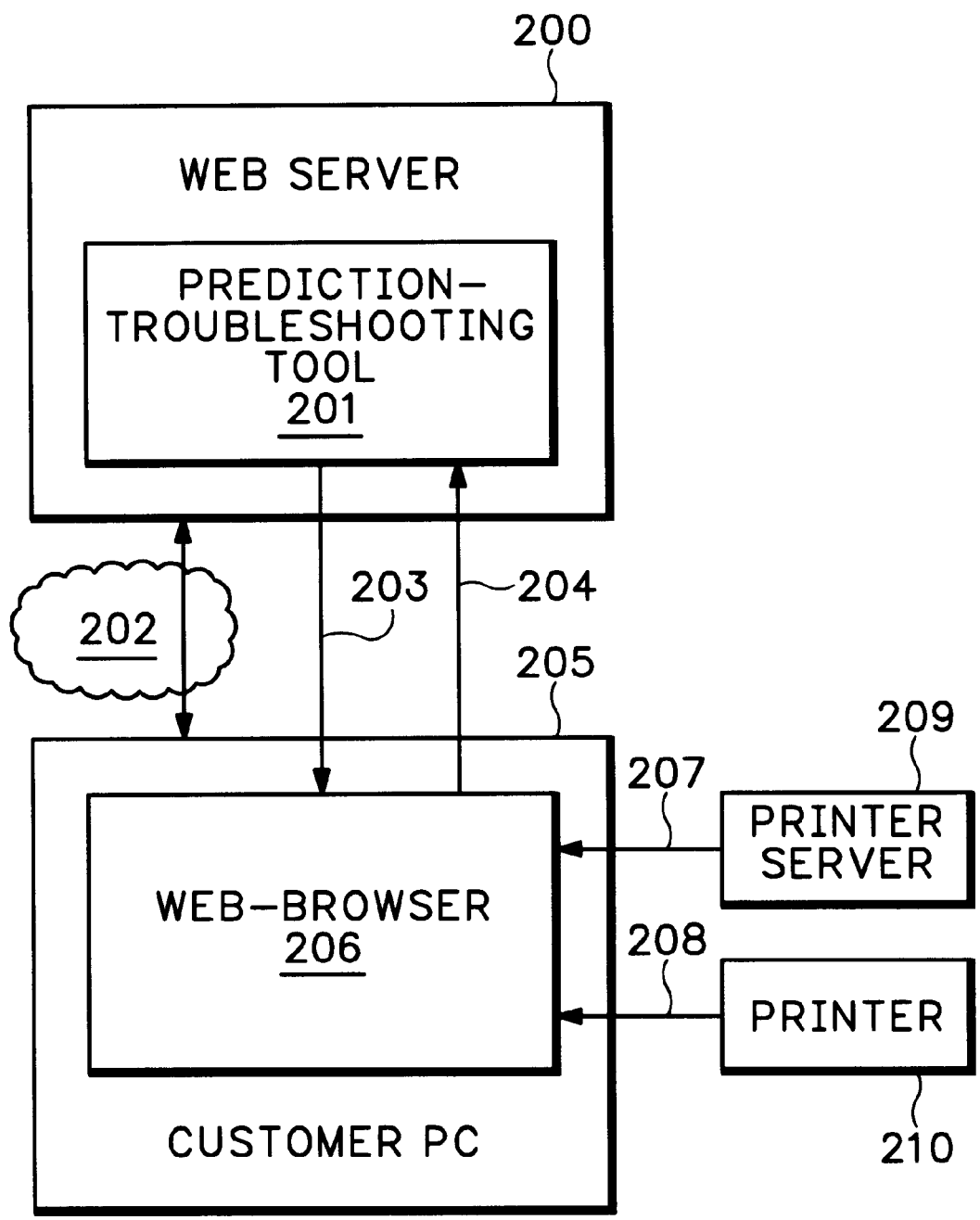
FIG. 1 is a block diagram schematic drawing of a troubleshooting environment in accordance with the present invention.

FIG. 1 shows an exemplary system in which the present invention is employed, the system including an Internet web-server 200, a customer personal computer ("PC") 205, a printer server 209 and a printer 210. This FIGURE typifies an exemplary system where the present invention can be used to troubleshoot and predict problem solutions; no limitation on the scope of the invention is intended nor should any be implied. The term "Internet" is used herein as generic for a collection of distributed, interconnected networks (ARPANET, DARPANET, World Wide Web, or the like) that are linked together by a set of industry standard protocols to form a global, distributed network. "Internet" and "web" are used interchangeably hereinafter. This artifice is intended to also refer to intranets and the like where the invention can be employed in accordance with the current state-of-the-art. Client/Browser/Server means: a model of interaction in a distributed computer network system in which a program at one site sends a request to another site and then waits for a response. The requesting program is called the "client," and the program which responds to the request is called the "server." In the context of the Internet, the client is a "browser;" i.e., a program which runs on a computer of an end-user.

In accordance with the present invention, a "PREDICTION-TROUBLESHOOTING TOOL" 201 runs on the web server 200. It is contemplated that the server 200 be maintained at the OEM or a related company (e.g., a service organization). An end-user on the "CUSTOMER PC" 205 can access the tool 201 over the Internet 202 (represented by a "cloud" symbol) using a commercially available or proprietary web browser 206 program. It is specifically intended that the present invention can be implemented in both text type and voice recognition interface modes.

In general, in response to the PC 205 input 204 to the tool 201 over the Internet 202 describing an equipment failure mode being experienced by the customer, the tool provides predictive potential causes and directed information data 203 providing best probable solutions. For example, a customer may be experiencing trouble printing hard copy from the PC 205. The customer input 204 can include information 207, 208 from both the printer server 209 and printer 210. Note also that while a hardware problem is described with respect to this exemplary embodiment, software and firmware problems may likewise be analyzed in accordance with the present invention. The present invention provides a prediction/troubleshooting tool, working continuously in a real-time based systematic manner on "clues" or "hints" appearing in a stream of plain text or in combination with an exchange of free-form plain text transmission data input 204 from the customer PC 205 interspersed with questions generated at the tool 201 during analysis of the data input and transmitted back 203 to the customer. For example, during a data exchange session 203, 204, a pop-up window with a question may be transmitted 203 to the customer. The customer has the option of ignoring the question or stopping the free-form input and responding directly when it would appear that a direct answer may facilitate the session.

Figure 2:
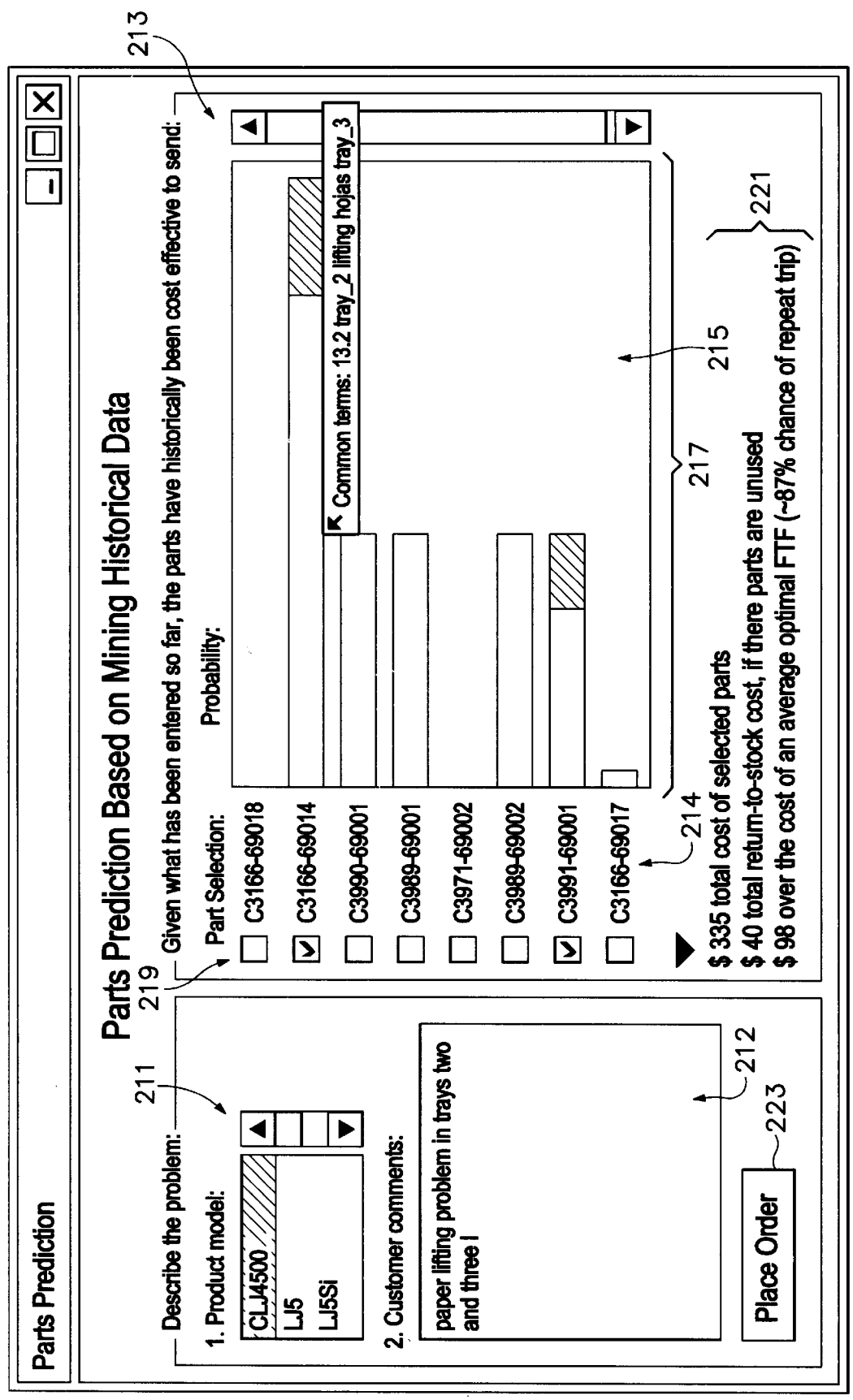
FIG. 2 is an exemplary computer screen illustrative of a graphical user interface ("GUI") in accordance with the present invention.

A specific exemplary, interactive, graphical user interface ("GUI") 210 screen is shown in FIG. 2. Note that the GUI 210 may be used by an OEM agent, "a call qualifier," assisting with a troubleshooting session call from the customer, or may be provided directly to the customer over the internet 202 as a fully automated tool, including real-time generated, directed information 203 regarding probable solutions.

The OEM creates a data base correlating replaceable part numbers, or other potential failure mode "solutions," of each installed-base product with a set of keywords. This data base may be created using any one of known programs, e.g., Belief Network Power Constructor. The data base can be updated by the tool 201 after subsequent troubleshooting processes.

Figure 3:
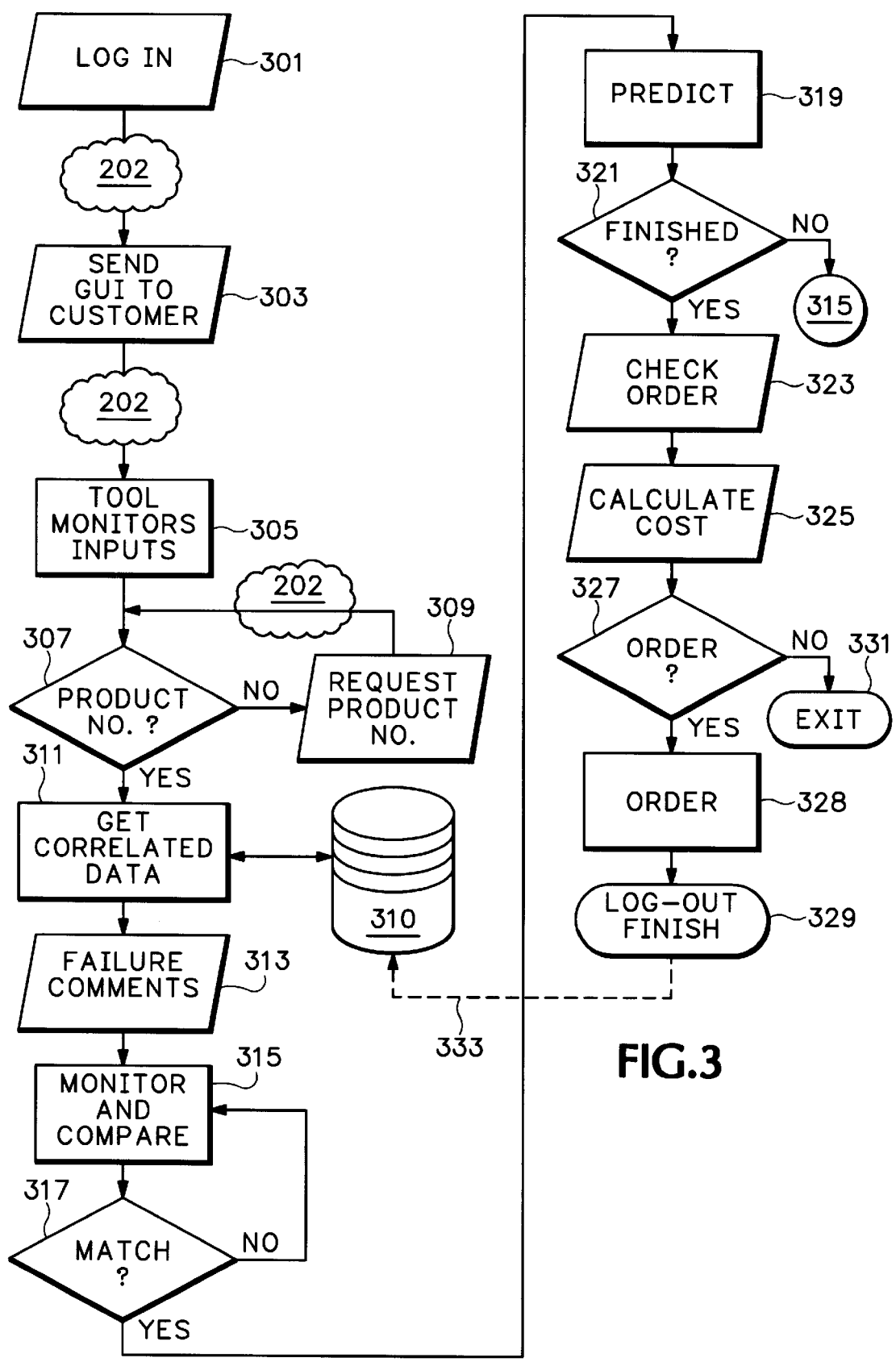
FIG. 3 is a flow chart of the methodology of the present invention.

An exemplary best mode of the process of reporting a failure mode and receiving troubleshooting feedback information is shown in FIG. 3. Looking to both FIGS. 2 and 3, the customer PC 205 logs in, step 301, to the tool 201 using known manner protocols and handshake routines over the Internet 202. That is, to the end-user's PC 205, the tool 201 appears as an accessible web site provided by the OEM. Following authentication, the OEM server 200 sends the tool's GUI 210, step 303, back to the customer over the Internet 202. The troubleshooting and prediction regarding a specific failure mode report can then commence. Note, that as an alternative, an OEM call agent can be using the tool without connection to the customer PC, transcribing a verbal exchange with the customer; a combination of both processes can be employed.

With a link open between the OEM server 200 and the browser 206, tool 201 monitors all inputs 204 from the CUSTOMER PC 205. Within the tool 201 GUI 210, an "Product model:" subwindow 211 provides a blank for the customer to enter a product model designator, or select from pre-listed products, for the equipment, e.g. PRINT SERVER 209, PRINTER 210 for which the failure mode is being reported. The first input 204 to be recognized, step 307, is the product model, e.g., the FIG. 2 selection of model CLJ4500, highlighted. Should the end-user fail to select a product model designator prior to sending specific comments to be described hereinafter, the tool 201 sends a pop-up window request for that information, step 309, since it is generally a prerequisite to analysis of the problem being experienced.

Once the customer's product model number is identified, the tool 201 accesses the database 310 containing the correlated data for that specific model, step 311. The GUI 210 automatically generates a subwindow 213 related to the selected model. In essence, this subwindow 213 is a list 214 of replaceable parts, 5 labeled "Part Selection:" and a prediction subwindow "Probability:" indicator 215 (note that other "solutions" besides parts can be listed; e.g., software upgrades, new products, and the like). With respect to software problems, the subwindow 213 may relate to upgrades, bug or computer virus extermination, or the like.

The customer next expresses comments, step 313, regarding the failure mode being experienced in another GUI 210 subwindow 212, FIG. 2. For example, regarding the printer 210, the customer "report" is a second input 204 to the tool 201: "paper lifting problem in trays two and three". The comments are expected in free-form, anything that the end-user is experiencing expressed in his own words, or "plain text," as the current problem(s). These real-time comments become the "clues" or "hints" for the tool 201 to analyze with respect to probable problem causes and potential fixes.

The tool 201 continuously monitors and compares, steps 315, 317, the real-time comments for keyword matches in the correlated data taken from database 310. Then, depending on each match hit, the Probability indicator 215 automatically updates, step 319. The bar graph region 217 adjacent each replaceable part listed 214 may grow or shrink according to the hits recorded. A threshold indication is provided for each available replaceable part. In addition, there may be bars (and thresholds) for combinations of parts. The movement of each bar may be dependent upon movement in other bars. For example, based on the comment "paper lifting problem in trays two and three," the tool has registered probabilities based on the historical data 310 that while any one of the listed parts may have failed, the probability that part "C3166-69014" and part "C3991-69001" may have failed has crossed an OEM determined threshold. Generally the OEM determined threshold is expected to be related to the replacement part's cost. In other words, to indicate the OEM determination, each individual probability bar graph adjacent to those two parts is shown as over the threshold by changing the bar color, e.g., from green to yellow (represented in FIG. 2 as changing from white to hatched) and therefore each are a likely cause of the problem and candidate for replacement. Thus, in the example, while six parts of the eight listed parts 219 show some probability of failure, only those two have crossed the threshold, changing color.

The customer, (or OEM call agent using the tool 201) can enter as many comments as occurs to them, watching for changes in the Probability indicator 215. In one embodiment, certain probability threshold crossings may trigger pop-up window questions (not shown) which are more decisive than the current keyword match indication. A direct answer may affect the probability level for correlated part(s).

The tool 201 continues to monitor, compare, and predict as long as the customer 205 continues to report 212, 305. If the customer reaches a point where they are satisfied that one or more parts should be ordered based upon the Probability indicator 215 data, they can stop reporting, step 321, Yes-path, and click on the check boxes 219 provided for ordering parts, step 323. Other programmable factors, e.g., elapsed time since last input received, or the like, can be used to determine when the input 305 is finished or sufficient 321. The tool 201 may notify the customer accordingly such as with a pop-up window response in a known manner. The tool 201 automatically generates costs 221 to the customer, step 325. If the customer decides to proceed with the order, step 327, Yes-path, a simple click on the "PLACE ORDER" button 223, step 328, of the GUI 210 transmits the order and then allows logging out or otherwise finishing the process, step 329. If the customer decides not to order, simply clicking on the Window exit button "X" can terminate the process and the link, step 331.

Note that features advantageous to the customer can be added to the basic embodiment just described, e.g., special pricing, shipping information, and the like. Or, as another example, a cost total 221 may exceed a reasonable repair amount or even the cost of a new product; alternative resolution recommendation windows can pop-up. The tool 201 can provide information to OEM field representatives, such as, based on the selected replacement parts, an estimate of a probability that the listed parts are insufficient for the repair and an additional trip for parts may be required, e.g. see FIG. 2 notice: "(~87% chance of repeat trip)."

In real-time, or once off-line, the tool 201 can update the data base 310 as to newly adapted keywords or the like to aid in subsequent cycles (represented by dashed-line 333).

In a preferred embodiment, the best mode in terms of efficiency may comprise a combination of the free form input coupled with a question-and-answer aid where the end-user is free at all times to either continue entering free form text or stopping and providing a direct answer to a question.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . ."

What is claimed is:

1. A computerized diagnostic system comprising:
a data base correlating product information with keywords related to failure modes;
an interface program for receiving plain text related to the failure modes and for comparing said plain text to the keywords and for predicting probabilities of potential solutions to said failure modes based upon said comparing, the interface program including program routines for ordering solutions associated with said failure modes, and program routines for providing cost analysis for said ordering selected ones of the potential solutions.

2. The system as set forth in claim 1, the interface program comprising:

an interactive program between a server and a client.

3. The system as set forth in claim 2, the interface program further comprising:

question-and-answer sessions interspersed with said receiving plain text words related to the failure modes.

4. The system as set forth in claim 1, the interface program further comprising:

program means for updating the data base based on a session of said comparing said plain text words to the keywords and predicting probabilities of potential solutions.

5. The system as set forth in claim 1, the interface program further comprising:

program routines for providing probability of ordered selected ones of the potential solutions of resolving a specific failure mode associated therewith.

6. A method for troubleshooting product failures, the method comprising:

providing a data base correlating product information with keywords related to failure modes:

using a network link, rerorting at least one specific one of said failure modes of at least one product;

in real time, comparing correlated product information from said data base to said reporting at least one specific one of said failure modes and based on said comparing, predicting probabilities of effectiveness of potential solutions to curing said at least one specific one of said failure modes; and providing cost analysis for ordering selected ones of the potential solutions.

7. The method as set forth in claim 6, using a network link further comprising:

establishing computerized communications between a server local to said data base and a remote client.

8. The method as set forth in claim 6, said reporting further comprising:

describing said at least one specific one of said failure modes in a plain text format.

9. The method as set forth in claim 6, further comprising:

updating the data base based on a cycle of said comparing and final selected ones of the potential solutions.

10. The method as set forth in claim 6, further comprising:

ordering solutions associated with said failure modes across said link.

11. The method as set forth in claim 6, further comprising:

providing probability of ordered selected ones of the potential solutions of resolving a specific failure mode associated therewith.

12. A method of doing business with respect to troubleshooting and providing solutions to reported failures of installed base products, wherein an entity doing said business maintains a data base of product information correlated to failure mode scenario information as represented by keywords, the method comprising:

establishing a server having an internet access site;

providing a resolution prediction troubleshooting tool at said site;

allowing client access to said site via a browser;

following client access of the site, receiving a client generated report of at least one specific one of said failures of at least one installed base product; and in real time, comparing the keywords to said report and based on said comparing, predicting probabilities of potential solutions to curing a specific failure represented by said report and transmitting said probabilities to said client, said transmitting including providing cost analysis for ordering selected ones of the potential solutions.

13. The method as set forth in claim 12, further comprising:

said client generated report is adapted for describing said at least one specific one of said failure modes in a plain text format.

14. A The method as set forth in claim 12, further comprising:

updating the data base based on a current cycle of said comparing and predicting.

15. The method as set forth in claim 14, said updating further comprising:

updating the data base based on previous predictions that were accepted as a part ordered solution.

16. The method as set forth in claim 12, further comprising:

said client is provided with means for ordering solutions associated with said failure modes across said link.

17. The method as set forth in claim 16, further comprising:

shipping ordered solutions to said client.

18. The method as set forth in claim 12, said comparing further comprising:

transmitting to said client question-and-answer questions related to said keywords.

19. The method as set forth in claim 12, further comprising:

using voice recognition programs for said receiving.

20. The method as set forth in claim 12, said cost analysis further comprising:

explaining recommended solutions based on costs and probability of likelihood of curing said specific failure.

* * * * *